(12) United States Patent
Vanier et al.

(10) Patent No.: US 9,938,416 B2
(45) Date of Patent: Apr. 10, 2018

(54) ABSORPTIVE PIGMENTS COMPRISING GRAPHENIC CARBON PARTICLES

(71) Applicant: PPG Industries Ohio, Inc., Cleveland, OH (US)

(72) Inventors: Noel R. Vanier, Wexford, PA (US); Eldon L. Decker, Gibsonia, PA (US); Stephen B. Istivan, Pittsburgh, PA (US); Cheng-Hung Hung, Wexford, PA (US); Gina R. Bonnett, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/440,571

(22) Filed: Feb. 23, 2017

(65) Prior Publication Data

US 2017/0158880 A1    Jun. 8, 2017

Related U.S. Application Data

(63) Continuation-in-part of application No. 14/979,173, filed on Dec. 22, 2015, which is a continuation of
(Continued)

(51) Int. Cl.
*C09D 5/32* (2006.01)
*C09D 7/12* (2006.01)
(Continued)

(52) U.S. Cl.
CPC ............ *C09D 5/32* (2013.01); *C01B 31/0438* (2013.01); *C09C 1/46* (2013.01); *C09D 7/1216* (2013.01);
(Continued)

(58) Field of Classification Search
CPC .......... C09D 7/1216; C09D 5/24; C08K 3/04; C08L 33/08; C08L 67/00; C08L 75/04
See application file for complete search history.

(56) References Cited

U.S. PATENT DOCUMENTS 4,851,262 A    7/1989   McFeaters
5,114,477 A    5/1992   Mort et al.
(Continued)

FOREIGN PATENT DOCUMENTS

CN    102877109 A    1/2013
CN    103468057 A    12/2013
(Continued)

OTHER PUBLICATIONS

Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997, 110 pages.
(Continued)

*Primary Examiner* — Daniel C McCracken
(74) *Attorney, Agent, or Firm* — Alan G. Towner

(57) ABSTRACT

Thermally produced graphenic carbon particles for use as absorptive pigments are disclosed. The pigments may be used in coatings and bulk articles to provide favorable absorbance characteristics at various wavelengths including visible and infrared regions.

20 Claims, 6 Drawing Sheets

Related U.S. Application Data application No. PCT/US2015/057858, filed on Oct. 28, 2015, said application No. 14/979,173 is a continuation of application No. 14/348,280, filed as application No. PCT/US2012/057811 on Sep. 28, 2012, now Pat. No. 9,221,688, which is a continuation-in-part of application No. 13/249,315, filed on Sep. 30, 2011, now Pat. No. 8,486,363, and a continuation-in-part of application No. 13/309,894, filed on Dec. 2, 2011, now Pat. No. 8,486,364, said application No. 14/979,173 is a continuation-in-part of application No. 14/337,427, filed on Jul. 22, 2014, now Pat. No. 9,475,946, which is a continuation-in-part of application No. 14/348,280, filed as application No. PCT/US2012/057811 on Sep. 28, 2012, now Pat. No. 9,221,688, said application No. 14/337,427 is a continuation-in-part of application No. 14/100,064, filed on Dec. 9, 2013, now Pat. No. 9,574,094, said application No. 13/309,894 is a continuation-in-part of application No. 13/249,315, filed on Sep. 30, 2011, now Pat. No. 8,486,363.

(60) Provisional application No. 62/298,651, filed on Feb. 23, 2016, provisional application No. 62/122,720, filed on Oct. 28, 2014.

(51) Int. Cl.
*C09C 1/46* (2006.01)
*C01B 31/04* (2006.01)

(52) U.S. Cl.
CPC ...... *C01B 2204/32* (2013.01); *C01P 2002/74* (2013.01); *C01P 2006/12* (2013.01); *C01P 2006/60* (2013.01)

(56) References Cited

U.S. PATENT DOCUMENTS

| | | |
|---|---|---|
| 5,486,675 A | 1/1996 | Taylor et al. |
| 5,527,518 A | 6/1996 | Lynum et al. |
| 5,749,937 A | 5/1998 | Detering et al. |
| 5,763,548 A | 6/1998 | Matyjaszewski et al. |
| 5,788,738 A | 8/1998 | Pirzada et al. |
| 5,789,487 A | 8/1998 | Matyjaszewski et al. |
| 5,807,937 A | 9/1998 | Matyjaszewski et al. |
| 5,851,507 A | 12/1998 | Pirzada et al. |
| 5,935,293 A | 8/1999 | Detering et al. |
| 5,984,997 A | 11/1999 | Bickmore et al. |
| 5,989,648 A | 11/1999 | Phillips |
| 6,099,696 A | 8/2000 | Schwob et al. |
| 6,228,904 B1 | 5/2001 | Yadav et al. |
| 6,316,119 B1 | 11/2001 | Metzger et al. |
| 6,358,375 B1 | 3/2002 | Schwob |
| 6,441,066 B1 | 8/2002 | Woodworth et al. |
| RE37,853 E | 9/2002 | Detering et al. |
| 6,642,301 B2 | 11/2003 | White et al. |
| 6,652,967 B2 | 11/2003 | Yadav et al. |
| 6,669,823 B1 | 12/2003 | Sarkas et al. |
| 6,689,192 B1 | 2/2004 | Phillips et al. |
| 6,716,525 B1 | 4/2004 | Yadav et al. |
| 6,719,821 B2 | 4/2004 | Yadav et al. |
| 6,786,950 B2 | 9/2004 | Yadav et al. |
| 6,821,500 B2 | 11/2004 | Fincke et al. |
| 6,830,822 B2 | 12/2004 | Yadav |
| 6,849,109 B2 | 2/2005 | Yadav et al. |
| 7,071,258 B1 | 7/2006 | Jang et al. |
| 7,635,458 B1 | 12/2009 | Hung et al. |
| 7,754,184 B2 | 7/2010 | Mercuri |
| 7,776,303 B2 | 8/2010 | Hung et al. |
| 7,785,492 B1 | 8/2010 | Jang et al. |
| 7,790,285 B2 | 9/2010 | Zhamu et al. |
| 7,824,741 B2 | 11/2010 | Sandhu |
| 7,842,271 B2 | 11/2010 | Petrik |
| 8,047,248 B2 | 11/2011 | Prud'homme et al. |
| 8,048,950 B2 | 11/2011 | Prud'homme et al. |
| 8,129,466 B2 | 3/2012 | Polk et al. |
| 8,486,363 B2 | 7/2013 | Hung et al. |
| 8,486,364 B2 | 7/2013 | Vanier et al. |
| 8,691,441 B2 | 4/2014 | Zhamu et al. |
| 2002/0114949 A1 | 8/2002 | Bower et al. |
| 2003/0032716 A1 | 2/2003 | White et al. |
| 2004/0247515 A1 | 12/2004 | Gardner |
| 2005/0143327 A1 | 6/2005 | Hirsch |
| 2005/0271574 A1 | 12/2005 | Jang et al. |
| 2006/0093885 A1 | 5/2006 | Krusic et al. |
| 2006/0121279 A1 | 6/2006 | Petrik |
| 2006/0216222 A1 | 9/2006 | Jang |
| 2007/0045116 A1 | 3/2007 | Hung et al. |
| 2007/0096066 A1 | 5/2007 | Yoshida et al. |
| 2007/0237705 A1 | 10/2007 | Itoh et al. |
| 2008/0188610 A1 | 8/2008 | Polk et al. |
| 2008/0206124 A1 | 8/2008 | Jang et al. |
| 2009/0022649 A1 | 1/2009 | Zhamu et al. |
| 2009/0054581 A1 | 2/2009 | Prud'homme et al. |
| 2009/0061194 A1* | 3/2009 | Green ............... B82Y 10/00 428/220 |
| 2009/0068471 A1 | 3/2009 | Choi et al. |
| 2009/0075035 A1 | 3/2009 | O'Brien et al. |
| 2009/0110627 A1 | 4/2009 | Choi et al. |
| 2009/0169467 A1 | 7/2009 | Zhamu et al. |
| 2010/0000441 A1 | 1/2010 | Jang et al. |
| 2010/0036023 A1 | 2/2010 | Weng et al. |
| 2010/0047154 A1 | 2/2010 | Lee et al. |
| 2010/0055017 A1 | 3/2010 | Vanier et al. |
| 2010/0055025 A1 | 3/2010 | Jang et al. |
| 2010/0072430 A1 | 3/2010 | Gergely et al. |
| 2010/0096597 A1 | 4/2010 | Prud'homme et al. |
| 2010/0126660 A1 | 5/2010 | O'Hara |
| 2010/0247801 A1 | 9/2010 | Zenasni |
| 2010/0255219 A1 | 10/2010 | Wenxu et al. |
| 2010/0301212 A1 | 12/2010 | Dato et al. |
| 2010/0303706 A1 | 12/2010 | Wallace et al. |
| 2010/0314788 A1 | 12/2010 | Hung et al. |
| 2010/0323113 A1 | 12/2010 | Ramappa et al. |
| 2011/0046289 A1 | 2/2011 | Zhamu et al. |
| 2011/0070426 A1 | 3/2011 | Vanier et al. |
| 2012/0021160 A1 | 1/2012 | Kariyada |
| 2012/0142832 A1 | 6/2012 | Varma et al. |
| 2012/0211160 A1 | 8/2012 | Asay et al. |
| 2012/0277360 A1 | 11/2012 | Scheffer et al. |
| 2013/0084236 A1 | 4/2013 | Hung et al. |
| 2013/0084237 A1 | 4/2013 | Vanier et al. |
| 2013/0119321 A1 | 5/2013 | Lettow |
| 2014/0057165 A1 | 2/2014 | Yamakaji et al. |
| 2014/0248214 A1* | 9/2014 | Hersam ............... C08K 3/04 424/9.1 |
| 2014/0272591 A1 | 9/2014 | Vanier et al. |
| 2014/0275409 A1* | 9/2014 | Bendiksen ............... C08K 3/04 524/590 |
| 2015/0159024 A1 | 6/2015 | Decker et al. |

FOREIGN PATENT DOCUMENTS

| | | |
|---|---|---|
| DE | 102011003619 A1 | 8/2012 |
| EP | 2562766 A1 | 2/2013 |
| KR | 20120029530 A | 3/2012 |
| KR | 20130013689 A | 2/2013 |
| WO | 98040415 A1 | 9/1998 |
| WO | 2009123771 A3 | 10/2009 |
| WO | 2009134492 A2 | 11/2009 |
| WO | 2010107769 A2 | 9/2010 |
| WO | 2011012874 A1 | 2/2011 |
| WO | 2011086391 A1 | 7/2011 |
| WO | 2013049498 A1 | 4/2013 |
| WO | 2013165677 A1 | 11/2013 |
| WO | 2013166414 A2 | 11/2013 |
| WO | 2013192180 A2 | 12/2013 |
| WO | 2014070346 A1 | 5/2014 |
| WO | 2015089026 A1 | 6/2015 |

(56) References Cited

FOREIGN PATENT DOCUMENTS

OTHER PUBLICATIONS

Brunaeur et al., "Adsorption of Gases in Multimolecular Layers", Journal of the American Chemical Society, 1938, vol. 60, pp. 309-319.
Cassagneau et al., "Preparation of Layer-by-Layer Self-Assembly of Silver Nanoparticles Capped by Graphite Oxide Nanosheets", J. Phys. Chem. B 1999, 103, pp. 1789-1793.
Chen et al., "Application of Organometallic Chemistry to the Electrical Interconnection of Graphene Nanoplatelets", Chem. Mater., 2016, vol. 28 (7), pp. 2260-2266.
Chen, "Oxidation Resistance of Graphene-Coated Cu and Cu/Ni Alloy", ACS Nano, Jan. 28, 2011, pp. 1321-1327.
Choi et al., "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.
Coraux, "Growth of Graphene on Ir(111)", New Journal of Physics 11, 2009, 023006, pp. 1-22.
Dato et al., "Substrate-Free Gas-Phase Synthesis of Graphene Sheets", Nano Letters, vol. 8, No. 7, 2008, pp. 2012-2016.
Dresselhaus et al., "Science of Fullerenes and Carbon Nanotubes", Academic Press, Inc., 1996, pp. 60-79.
Du et al., "Facile Synthesis of Highly Conductive Polyaniline/Graphite Nanocomposites", European Polymer Journal 40, 2000, pp. 1489-1493.
Fincke et al., "Plasma Pyrolysis of Methane to Hydrogen and Carbon Black", Industrial and Engineering Chemistry Research, vol. 41, No. 6, 2002, pp. 1425-1435.
Fitzer et al., "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.
Gannon, "Acetylene from Hydrocarbons", Kirk-Othmer Encyclopedia of Chemical Technology, 2003, pp. 1-28.
Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.
Gonzalez-Aguilar et al., "Carbon Nanostructures Production by Gas-Phase Plasma Processes at Atmospheric Pressure", J. Phys. D, Appl. Phys., vol. 40, No. 8, 2007, pp. 2361-2374.
Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976, pp. 439-444.
Ji et al., "Graphene/Si Multilayer Structure Anodes for Advanced Half and Full Lithium-Ion Cells", Nano Energy, 2011, pp. 1-8.
Khan et al., "Survey of Recent Methane Pyrolysis Literature", Industrial and Engineering Chemistry, vol. 62, No. 10, Oct. 1970, p. 54.
Kim et al., "Fabrication of Graphene Flakes Composed of Multi-Layer Graphene Sheets using a Thermal Plasma Jet System", Nanotechnology 21, Jan. 29, 2010, pp. 1-6.
Kim et al., "Continuous Synthesis of Nanostructured Sheetlike Carbons by Thermal Plasma Decomposition of Methane", IEEE Transactions on Plasma Science, vol. 35, No. 2, Apr. 2007, pp. 434-443.
Kostic et al., "Thermodynamic Consideration of B—O—C—H System for Boron Carbide (B4C) Powder Synthesis in Thermal Plasma", Progress in Plasma Processing of Materials, 1997, pp. 889-898.
Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997, 138 pages.
Malesevic et al., "Synthesis of Few-Layer Graphene via Microwave Plasma-Enhanced Chemical Vapour Deposition", Nanotechnology 2008, vol. 19, No. 30, 305604, 6 pages.
Martin-Gallego et al., "Epoxy-Graphene UV-Cured Nanocomposites", Polymer, vol. 52, 2011, pp. 4664-4669.
McWilliams, "Graphene: Technologies, Applications, and Markets", BCC Research Report, Feb. 2011, 28 pages.
Nandamuri et al., "Chemical Vapor Deposition of Graphene Films", Nanotechnology 21, 2010, 145604, 4 pages.
Prasai et al., "Graphene: Corrosion-Inhibiting Coating", ACS Nano, 6 (2), 2012, pp. 1102-1108.
Pristavita et al., "Carbon Blacks Produced by Thermal Plasma: the Influence of the Reactor Geometry on the Product Morphology", Plasma Chem. Plasma Process, 30, 2010, pp. 267-279.
Pristavita et al., "Carbon Nano-Flakes Produced by an Inductively Coupled Thermal Plasma System for Catalyst Applications", Plasma Chem. Plasma Process, 31, 2011, pp. 393-403.
Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.
Skinner, "Pyrolysis of Methane and the C2 Hydrocarbons", Monsanto Chemical Co., Research and Engineering Division, Dayton 7, Ohio, 1959, pp. 59-68.
Su et al., "Could Graphene Construct an Effective Conducting Network in a High-Power Lithium Ion Battery?", Nano Energy 1, 2012, pp. 429-439.
Subrahmanyam et al., "Simple Method of Preparing Graphene Flakes by an Arc-Discharge Method", The Journal of Physical Chemistry C, vol. 113, No. 11, 2009, pp. 4257-4259.
Tang et al., "Processible Nanostructured Materials with Electrical Conductivity and Magnetic Susceptibility: Preparation and Properties of Maghemite/Polyaniline Nanocomposite Films", Chem. Mater., vol. 11, No. 6, 1999, pp. 1581-1589.
Zhong et al., "Catalytic Growth of Carbon Nanoballs With and Without Cobalt Encapsulation", Chemical Physics Letters 330, 2000, pp. 41-47.

* cited by examiner

ABSORPTIVE PIGMENTS COMPRISING GRAPHENIC CARBON PARTICLES

CROSS-REFERENCE TO RELATED APPLICATIONS

This application claims the benefit of U.S. Provisional Patent Application Ser. No. 62/298,651 filed Feb. 23, 2016, which is incorporated herein by reference. This application is a continuation-in-part of U.S. patent application Ser. No. 14/979,173, filed Dec. 22, 2015, which is a continuation of PCT International Patent Application Serial No. PCT/US2015/057858 filed Oct. 28, 2015, which claims the benefit of U.S. Provisional Application Ser. No. 62/122,720 filed Oct. 28, 2014. The Ser. No. 14/979,173 is also a continuation-in-part of U.S. patent application Ser. No. 14/348,280 filed Mar. 28, 2014, now issued as U.S. Pat. No. 9,221,688 issued Dec. 29, 2015, which is a national phase of PCT International Patent Application Serial No. PCT/US2012/057811 filed Sep. 28, 2012. PCT International Patent Application Serial No. PCT/US2012/057811 is a continuation-in-part of U.S. patent application Ser. No. 13/249,315 filed Sep. 30, 2011, now U.S. Pat. No. 8,486,363 issued Jul. 16, 2013, and is also a continuation-in-part of U.S. patent application Ser. No. 13/309,894 filed Dec. 2, 2011, now U.S. Pat. No. 8,486,364 issued Jul. 16, 2013. The Ser. No. 14/979,173 is also a continuation-in-part of U.S. patent application Ser. No. 14/337,427 filed Jul. 22, 2014, now U.S. Pat. No. 9,475,946 issued Oct. 25, 2016, which is a continuation-in-part of U.S. patent application Ser. No. 14/348,280 filed Mar. 28, 2014. U.S. patent application Ser. No. 14/348,280 is a national phase of PCT International Patent Application Serial No. PCT/US2012/057811. U.S. patent application Ser. No. 14/337,427 filed Jul. 22, 2014, is a continuation-in-part of U.S. patent application Ser. No. 14/100,064 filed Dec. 9, 2013, now U.S. Pat. No. 9,574,094 issued Feb. 21, 2017. U.S. patent application Ser. No. 13/309,894 filed Dec. 2, 2011 is a continuation-in-part of U.S. patent application Ser. No. 13/249,315 filed Sep. 30, 2011. All of these applications and patents are incorporated herein by reference.

FIELD OF THE INVENTION

The present invention relates to the use of graphenic carbon particles as absorptive pigments.

BACKGROUND OF THE INVENTION

Specialty carbon blacks are used as absorptive pigments for many applications. They have good electromagnetic radiation absorption across the visible spectrum and in to the infrared (IR) and ultraviolet (UV) regions, have good durability, and are relatively inexpensive. However, carbon black pigments may not provide optimal electromagnetic radiation absorbing properties.

SUMMARY OF THE INVENTION

An aspect of the invention provides an absorptive coating comprising a resin film, and an absorptive pigment comprising thermally produced graphenic carbon particles in an amount up to 20 weight percent based on the total dry film weight of the coating, wherein the absorptive coating has a minimum absorbance of 80 percent throughout a wavelength range of 400 to 1,400 nm.

Another aspect of the invention provides an absorptive coating composition comprising a solvent, a film-forming resin and thermally produced graphenic carbon particles in an amount up to 20 weight percent of the total solids weight of the film-forming resin and the thermally produced graphenic carbon particles, wherein the absorptive coating composition has a minimum absorbance of 80 percent throughout a wavelength range of 400 to 1,400 nm when cured.

Another aspect of the invention provides an article comprising a matrix material and an absorptive pigment dispersed in the matrix material comprising thermally produced graphenic carbon particles in an amount up to 20 weight percent based on the total weight of the matrix material and the thermally produced graphenic carbon particles, wherein the article has a minimum absorbance of 80 percent throughout a wavelength range of 400 to 1,400 nm.

DETAILED DESCRIPTION

Figure 1:
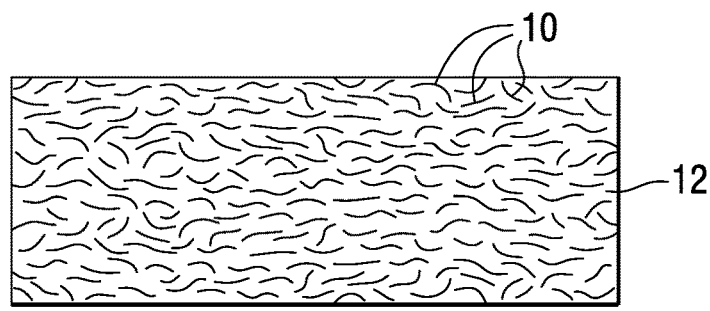
FIG. 1 is a partially schematic side sectional view of an article comprising thermally produced graphenic carbon particles disbursed in a matrix material in accordance with an embodiment of the present invention.

FIGS. 1-4 schematically illustrate the use of absorptive thermally graphenic carbon particles in various materials in accordance with embodiments of the present invention. As shown in FIG. 1, thermally graphenic carbon particles 10 may be dispersed in a matrix material 12 such as polymers, glass, ceramics and liquids in order to increase absorbance in the materials. The produced graphenic carbon particles may be provided in any desired loading amounts in the matrix material, for example, from 0.001 to 30 weight percent based on the total weight of the matrix material and the graphenic carbon particles, e.g., from 0.01 to 20 weight percent, or from 0.05 to 5 or 10 weight percent, or from 0.1 to 2 or 3 weight percent. Examples of matrix materials or articles containing graphenic carbon particles dispersed therein include: extruded or molded thermoset or thermoplastic polymers for use in industries such as construction, transportation, electronic devices and the like; glass for use in industries such as automotive, construction, aircraft, watercraft and the like; coatings for use in industries such as architectural, automotive, aerospace, consumer electronics and the like; and inks for use in industries such as documents, billboards, barcoding and the like. Such articles may be of varying dimensions. For example, bulk articles may have length, width, and/or height dimensions of greater than 100 microns, or greater than 1 micron, or greater than 1 mm, or greater than 1 cm, or greater than 10 cm. Coatings and inks may have thicknesses of less than 1 micron up to 100 microns or more, for example, from 1 to 50 microns, or from 2 to 40 microns, or from 3 to 30 microns.

Figure 2:
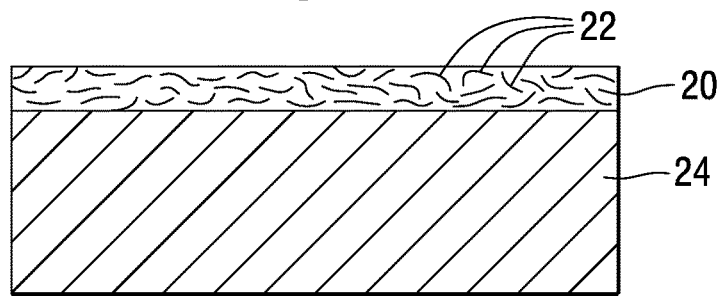
FIGS. 2-4 are partially schematic side sectional views of coatings applied to substrates, including coating layers comprising graphenic carbon particles that act as absorptive pigments in accordance with embodiments of the present invention.

As shown in FIG. 2, an absorptive coating 20 comprising thermally produced graphenic carbon particles 22 dispersed therein may be applied onto a substrate 24. Examples of suitable substrates include: polymers such as polyethylene terephthalate, polyethylene, polypropylene and the like; glass; alumina; and metals such as steel and aluminum. Examples of industrial uses for such absorptive coatings include decorative, light blocking, UV protection, heat absorbing and the like.

Figure 3:
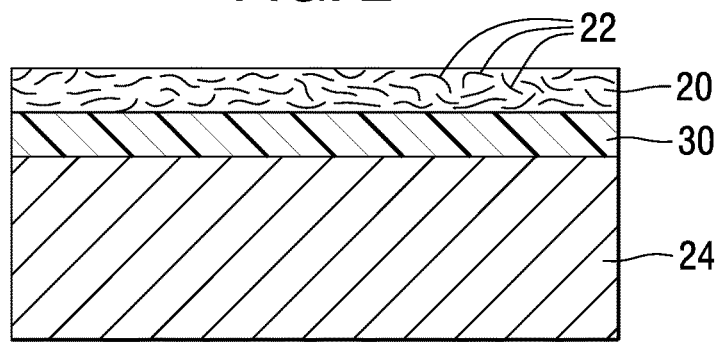

As shown in FIG. 3, a top absorptive coating 20 comprising thermally produced graphenic carbon particles 22 is provided over an intermediate underlying coating 30, which is deposited on a substrate 24. Examples of intermediate coatings 30 include electrode position coatings, primer coatings, color coatings and the like. Examples of substrates 24 include metals such as steel and aluminum, polymers such as polypropylene, and the like. Industrial uses for such absorptive top coatings with intermediate coating(s) underneath include automobile coatings, aerospace coatings, industrial coatings and the like.

Figure 4:
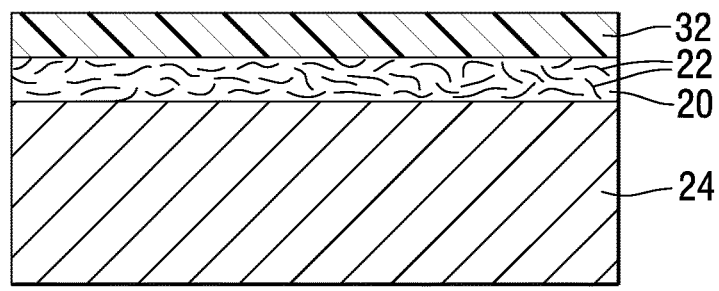

As shown in FIG. 4, an intermediate absorptive coating 20 containing thermally produced graphenic carbon particles 22 is deposited on a substrate 24 to form an underlying absorptive coating layer, with a top coating 32 applied over the absorptive coating layer 20. The thermally produced graphenic carbon particle-containing underlying coating 20 may include any suitable type of resin and/or binder, as more fully described below. The substrate 24 may comprise any suitable types of materials, such as the substrate materials described above. The top coating 32 may comprise any desired coating or coatings such as paints, clearcoats and the like typically used for various applications including automotive, architectural, aerospace, industrial and the like. In certain embodiments, in addition to the coating layers shown in FIG. 4, a primer layer, electrodeposited layer or the like may be allied on the substrate under the intermediate absorptive coating.

In the embodiments shown in FIGS. 2-4, the thicknesses of each absorptive coating layer and other layers may be selected as described in more detail below.

In accordance with embodiments of the invention, thermally produced graphenic carbon particles provide favorable properties when used as absorptive pigments, i.e., the graphenic carbon particle pigments provide a favorable combination of reduced reflectance in the visible spectrum and near IR spectrum, as well as a neutral visual appearance of any light throughout the visible spectrum that may be reflected from the coating or article containing the graphenic carbon particles. The thermally produced graphenic carbon particles may provide extremely good absorption across the UV, visible and/or IR spectrums, e.g., stronger and more uniform than carbon blacks. Pigments comprising the graphenic carbon particles therefore give visual hiding and desirable near IR absorbance at substantially lower loadings than carbon black. Such opacity/hiding at lower levels than carbon black provides advantages such as weight savings and formulation freedom. In addition, the graphenic carbon particles may be produced at relatively low cost to provide low cost pigments.

As used herein, the term "coating" includes resinous and non-resinous films, inks, waxes and the like in which thermally produced graphenic carbon particle pigments may be dispersed. The dry film thickness of the coatings may typically range from less than 0.5 microns to 100 microns or more, for example, from 1 to 50 microns. As a particular example, the cured coating thickness may range from 1 to 15 or 20 microns. However, significantly greater coating thicknesses, and significantly greater material dimensions for non-coating materials, are within the scope of the invention.

In certain embodiments, the thermally produced graphenic carbon particle pigments may be used in coatings to provide desired absorbance characteristics various regions of the electromagnetic spectrum, including in the visible spectrum, e.g., wavelengths from 400 to 700 nm, and/or in the IR or UV regions, and/or in the microwave region. The absorbance may be measured throughout the UV range (e.g., from 100 to 400 nm), visible range from 400 to 700 nm, the near IR range (e.g., from 780 to 3,000 nm), the mid IR range (e.g., 5 to 25 microns), and/or the far IR range (e.g., 25 to 200 microns). In certain embodiments, the absorbance within a selected wavelength range may typically be at least 30 percent, at least 50 percent, at least 70 percent, at least 80 percent, at least 85 percent, or at least 90 percent. For example, when the present thermally produced graphenic carbon particles are used as absorptive pigments in coatings, the absorbance throughout the visible range and a portion of the near IR range from 400 to 1,400 nm may be at least 80 percent, or at least 85 percent, or at least 90 percent, or at least 95 percent at all wavelengths within the visible range. However, for certain applications, lower absorbance in the visible range may be desired, e.g., at relatively low loadings of the pigment particles. Furthermore, the variation of absorbance at specific wavelengths within a particular range of wavelengths may be reduced in accordance with embodiments of the invention. For example, the highest and lowest absorbance values for specific wavelengths within the 400 to 1,400 nm range may be within 15 percent of each other, or within 10 percent of each other, or within 5 percent of each other.

The absorbance of coatings may be dependent on the thickness of a particular coating, and the absorbance may be defined in terms of a standard film thickness at a given loading of graphenic carbon particles. As used herein, the term "minimum absorbance" means the minimum quantity of incident electromagnetic radiation, throughout a specified wavelength range, that is neither reflected nor transmitted by the sample and is measured by a protocol as described in Example 8 herein. As used herein, the term "minimum absorbance throughout a wavelength range of 400 to 1,400 nm" is defined and measured as described in Example 8 herein for a coating having a standard dry film thickness of 20 microns at a pigment particle loading of 0.5 weight percent based on the dry film weight of the standard 20 micron-thick coating. Thus, for a coating having a minimum absorbance of 80 percent throughout a wavelength of 400 to 1,400 nm, the absorbance is measured based on a standard coating of the same composition having a dry film thickness of 20 microns and a graphenic carbon particle loading of 0.5 weight percent based on the dry film weight of the standard coating, although the actual coating may have a different thickness and/or a different graphenic carbon particle loading than the standard coating.

The amount or loading of thermally produced graphenic carbon particles contained in the coatings in accordance with certain embodiments may be less than 20 weight percent based on the total dry film weight of the coating. For example, the graphenic carbon particles may comprise from 0.01 to 20 weight percent, or 0.02 to 10 weight percent, or from 0.05 to 5 weight percent, or from 0.1 to 2 weight percent of the total dry film weight of the coating. In certain embodiments, the amount of graphenic carbon particles contained in the coatings may be relatively low while providing the desired level of jetness. For example, the graphenic carbon particles may comprise less than 5 weight percent, less than 3 weight percent, less than 2 weight percent, or less than 1 weight percent, based on the total dry film weight of the coating. The particles may be dispersed uniformly through the coating, or non-uniformly, e.g., the particles may have a graded concentration through the thickness of the film coating.

In certain embodiments, the coatings may be made from coating compositions comprising thermally produced graphenic carbon particles dispersed within a curable coating composition comprising a solvent and a matrix material such as a film-forming resin or the like in amounts of from 0.01 to 20 weight percent based on the total solids of the coating composition. For example, the graphenic carbon particles may comprise from 0.02 to 10 weight percent, or from 0.05 to 5 weight percent, or from 0.01 to 2 weight percent of the solids weight of the coating composition.

In certain embodiments, thermally produced graphenic carbon particles may be dispersed in monolithic materials or articles rather than as a coating. In such embodiments, the graphenic carbon particles may be dispersed uniformly throughout the material, or may be dispersed non-uniformly, e.g., with graded loadings throughout the material. In such embodiments, the thermally produced graphenic carbon particles may typically comprise from 0.001 to 20 weight percent of the bulk material, based on the total weight of the material. For example, the graphenic carbon particles may comprise from 0.01 to 10 weight percent, or from 0.02 to 5 weight percent, or from 0.05 to 2 weight percent of the material.

The resinous coating compositions can comprise any of a variety of thermoplastic and/or thermosetting compositions known in the art. For example, the coating compositions can comprise film-forming resins selected from epoxy resins, acrylic polymers, polyester polymers, polyurethane polymers, polyamide polymers, polyether polymers, bisphenol A based epoxy polymers, polysiloxane polymers, styrenes, ethylenes, butylenes, copolymers thereof, and mixtures thereof or waxes. Generally, these polymers can be any polymers of these types made by any method known to those skilled in the art. Such polymers may be solvent borne, water soluble or water dispersible, emulsifiable, or of limited water solubility. Furthermore, the polymers may be provided in sol gel systems, may be provided in core-shell polymer systems, or may be provided in powder form. In certain embodiments, the polymers are dispersions in a continuous phase comprising water and/or organic solvent, for example emulsion polymers or non-aqueous dispersions.

Thermosetting or curable coating compositions typically comprise film forming polymers or resins having functional groups that are reactive with either themselves or a cross-linking agent. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, styrenic groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates. Examples of commercially available polyisocyanates include DESMODUR N3390, which is sold by Bayer Corporation, and TOLONATE HDT90, which is sold by Rhodia Inc. Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein. In certain embodiments, the resin can be self crosslinking. Self crosslinking means that the resin contains functional groups that are capable of reacting with themselves, such as alkoxysilane groups, or that the reaction product contains functional groups that are coreactive, for example hydroxyl groups and blocked isocyanate groups.

In addition to the resin and thermally produced graphenic carbon particle components, the coating compositions and cured coatings may include additional components conventionally added to coating or ink compositions, such as cross-linkers, pigments, tints, flow aids, defoamers, dispersants, solvents, UV absorbers, catalysts and surface active agents.

In addition to their use as pigments in coatings, the present thermally produced graphenic carbon particles may also be used as absorptive pigments in thermoplastic and/or thermoset plastic bulk articles. In this embodiment, the thermally produced graphenic carbon particles may be dispersed uniformly or non-uniformly in a matrix of the thermoplastic or thermoset plastic bulk material. The particles may typically comprise from 0.001 to 20 weight percent, or from 0.01 to 10 weight percent of the total combined weight of the thermoplastic and/or thermoset plastic and the thermally produced graphenic carbon particles of the bulk article. For example, from 0.05 to 5 weight percent or from 0.1 to 2 weight percent.

Suitable bulk thermoplastic materials in which the present thermally produced graphenic carbon particles may be dispersed as an absorptive pigment include polyethylene, polypropylene, polystyrene, polymethylmethacrylate, polycarbonate, polyvinylchloride, polyethyleneterephthalate, acrylonitrile-butadiene-styrene, polyvinylbutyral, and polyvinylacetate and the like. In certain embodiments, the thermoplastic may comprise polycarbonate, polyethylene and/or polyvinylchloride.

In certain embodiments, the plastic material in which the thermally produced graphenic carbon particles are dispersed as absorptive pigments include thermoset plastics such as polyurethane, melamine, phenolics, acrylics, polyesters and the like. For example, the thermoset plastic may comprise melamine, acrylics and/or polyurethane.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles have a width and length, measured in a direction parallel to the carbon atoms layers, of at least 25 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles have a Raman spectroscopy 2D/G peak ratio of at least 0.9:1, or at least 0.95:1, or at least 0.95:1, or at least 1.1, for example, at least 1.1:1 or 1.2:1 or 1.3:1. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles have a relatively low bulk density. For example, the graphenic carbon particles are characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles have a compressed density and a percent densification that is less than the compressed density and percent densification of graphite powder and certain types of substantially flat graphenic carbon particles such as those formed from exfoliated graphite. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pounds of force in a 1.3 centimeter die for 45 minutes, wherein the contact pressure is 500 MPa. The compressed density of the graphenic carbon particles is then calculated from this measured thickness according to the following equation:

$$\text{Compressed Density } (g/cm^3) = \frac{0.1 \text{ grams}}{\Pi*(1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

The morphology of the graphenic carbon particles may also be measured in terms of a dibutyl phthalate absorption number (DBPA) in accordance with the standard ASTM D2414 test. DBP absorption may be used to measure the relative structure of graphenic carbon particles by determining the amount of DBP a given mass of graphenic carbon particles can absorb before reaching a specific viscous paste. In accordance with certain embodiments, the DBPA of the thermally produced graphenic carbon particles may typically be at least 200, for example, from 200 to 800, or from 300 to 500.

In accordance with certain embodiments, percolation, defined as long range interconnectivity, occurs between the conductive graphenic carbon particles. Such percolation may reduce the resistivity of the coating compositions. The conductive graphenic particles may occupy a minimum volume within the coating such that the particles form a continuous, or nearly continuous, network. In such a case, the aspect ratios of the graphenic carbon particles may affect the minimum volume required for percolation.

In certain embodiments, at least a portion of the graphenic carbon particles to be dispersed in the compositions of the present invention may be made by thermal processes. In accordance with embodiments of the invention, thermally produced graphenic carbon particles are made from carbon-containing precursor materials that are heated to high temperatures in a thermal zone such as a plasma. As more fully described below, the carbon-containing precursor materials are heated to a sufficiently high temperature, e.g., above 3,500° C., to produce graphenic carbon particles having characteristics as described above. The carbon-containing precursor, such as a hydrocarbon provided in gaseous or liquid form, is heated in the thermal zone to produce the graphenic carbon particles in the thermal zone or downstream therefrom. For example, thermally produced graphenic carbon particles may be made by the systems and methods disclosed in U.S. Pat. Nos. 8,486,363 and 8,486,364.

In certain embodiments, the thermally produced graphenic carbon particles may be made by using the apparatus and method described in U.S. Pat. No. 8,486,363 at [0022] to in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to form the graphenic carbon particles. In other embodiments, the thermally produced graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature of at least 3,500° C., for example, from a temperature of greater than 3,500° C. or 4,000° C. up to 10,000° C. or 20,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

In certain embodiments, at least a portion of the thermally produced graphenic carbon particles as described above may be replaced with graphenic carbon particles from commercial sources, for example, from Angstron Materials, XG Sciences and other commercial sources. However, due to the high electromagnetic radiation absorbance of absorptive pigments comprising the thermally produced graphenic carbon particles of the present invention, their substitution with commercially available graphenic carbon particles may not be optimal for many applications. In such embodiments, the commercially available graphenic carbon particles may comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges. For example, when thermally produced graphenic carbon particles are combined with commercially available graphenic carbon particles in accordance with embodiments of the invention, a bi-modal distribution, tri-modal distribution, etc. of graphenic carbon particle characteristics may be achieved. The graphenic carbon particles contained in the compositions may have multi-modal particle size distributions, aspect ratio distributions, structural morphologies, edge functionality differences, oxygen content, and the like.

In certain embodiments, the graphenic carbon particles are functionalized. As used herein, "functionalized", when referring to graphenic carbon particles, means covalent bonding of any non-carbon atom or any organic group to the graphenic carbon particles. The graphenic carbon particles may be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. The graphenic carbon particles may also be functionalized by other reactions such as Diels-Alder addition reactions, 1,3-dipolar cycloaddition reactions, free radical addition reactions and diazonium addition reactions. In certain embodiments, the hydrocarbon and phenyl groups may be further functionalized. If the graphenic carbon particles already have some hydroxyl functionality, the functionality can be modified and extended by reacting these groups with, for example, an organic isocyanate.

In certain embodiments, coating compositions or other types of compositions in which the present absorptive pigments are dispersed may be produced by initially dispersing the graphenic carbon particles in a carrier. Such dispersions may comprise: (a) graphenic carbon particles such as any of those described above; (b) a carrier that may be selected from water, at least one organic solvent, or combinations of water and at least one organic solvent; (c) at least one polymeric dispersant, such as the copolymer described generally below; and, optionally, (d) at least one resin as described above or other additives.

Certain compositions comprise at least one polymeric dispersant. In certain embodiments, such a polymeric dispersant comprises a tri-block copolymer comprising: (i) a first segment comprising graphenic carbon affinic groups, such as hydrophobic aromatic groups; (ii) a second segment comprising polar groups, such as hydroxyl groups, amine groups, ether groups, and/or acid groups; and (iii) a third segment which is different from the first segment and the second segment, such as a segment that is substantially non-polar, i.e., substantially free of polar groups. As used herein, term "substantially free" when used with reference to the absence of groups in a polymeric segment, means that no more than 5% by weight of the monomer used to form the third segment comprises polar groups.

Suitable polymeric dispersants include acrylic copolymers produced from atom transfer radical polymerization. In certain embodiments, such copolymers have a weight average molecular weight of 1,000 to 20,000.

In certain embodiments, the polymeric pigment dispersant has a polymer chain structure represented by the following general formula (I),

$$\Phi\text{-}(G)_p\text{-}(W)_q\text{-}(Y)_s T \qquad (I)$$

wherein G is a residue of at least one radically polymerizable ethylenically unsaturated monomer; W and Y are residues of at least one radically polymerizable ethylenically unsaturated monomer with W and Y being different from one another; Y is optional; Φ is a hydrophobic residue of or derived from an initiator and is free of the radically transferable group; T is or is derived from the radically transferable group of the initiator; p, q and s represent average numbers of residues occurring in a block of residues; p, q and s are each individually selected such that the polymeric dispersant has a number average molecular weight of at least 250.

The polymeric dispersant may be described generally as having a head and tail structure, i.e., as having a polymeric head portion and a polymeric tail portion. The polymeric tail portion may have a hydrophilic portion and a hydrophobic portion, particularly at the terminus thereof. While not intending to be bound by any theory, it is believed that the polymeric head portion of the polymeric dispersant can be associated with the graphenic carbon particles, while the polymeric tail portion aids in dispersing the graphenic carbon particles and can be associated with other components of an ink or coating composition. As used herein, the terms "hydrophobic" and "hydrophilic" are relative to each other.

In certain embodiments, the polymeric dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In certain embodiments, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation of the polymeric dispersant include any transition metal compound that can participate in a redox cycle with the initiator and the growing polymer chain. It may be preferred that the transition metal compound not form direct carbon-metal bonds with the polymer chain. Transition metal catalysts useful in the present invention may be represented by the following general formula (II),

$$M^{n+}X_n \qquad (II)$$

wherein M is the transition metal; n is the formal charge on the transition metal having a value of from 0 to 7; and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$-alkoxy, cyano, cyanato, thiocyanato and azido. In one specific example, the transition metal is Cu(I) and X is halide, for example, chloride. Accordingly, one specific class of transition metal catalysts is the copper halides, for example, Cu(I)Cl. In certain embodiments, the transition metal catalyst may contain a small amount, for example, 1 mole percent, of a redox conjugate, for example, $Cu(II)Cl_2$ when Cu(I)Cl is used. Additional catalysts useful in preparing the polymeric dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the polymeric dispersant include, but are not limited to, compounds having one or more nitrogen, oxygen, phosphorus and/or sulfur atoms, which can coordinate to the transition metal catalyst compound, for example, through sigma and/or pi bonds. Classes of useful ligands include, but are not limited to, unsubstituted and substituted pyridines and bipyridines; porphyrins; cryptands; crown ethers; for example, 18-crown-6; polyamines, for example, ethylenediamine; glycols, for example, alkylene glycols, such as ethylene glycol; carbon monoxide; and coordinating monomers, for example, styrene, acrylonitrile and hydroxyalkyl (meth)acrylates. As used herein, the term "(meth)acrylate" and similar terms refer to acrylates, methacrylates and mixtures of acrylates and methacrylates. One specific class of ligands is the substituted bipyridines, for example, 4,4'-dialkyl-bipyridyls. Additional ligands that may be used in preparing polymeric dispersant are described in U.S. Pat. No. 5,807,937 at column 18, line 57 through column 21, line 43.

Classes of monomeric initiators that may be used in the ATRP preparation of the polymeric dispersant include, but are not limited to, aliphatic compounds, cycloaliphatic compounds, aromatic compounds, polycyclic aromatic compounds, heterocyclic compounds, sulfonyl compounds, sulfenyl compounds, esters of carboxylic acids, nitrites, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. The monomeric initiator may also be substituted with functional groups, for example, oxyranyl groups, such as glycidyl groups. Additional useful initiators are described in U.S. Pat. No. 5,807,937 at column 17, line 4 through column 18, line 28.

In certain embodiments, the monomeric initiator is selected from 1-halo-2,3-epoxypropane, p-toluenesulfonyl halide, p-toluenesulfenyl halide, $C_6$-$C_{20}$-alkyl ester of alpha-halo-$C_2$-$C_6$-carboxylic acid, halomethylbenzene, (1-haloethyl)benzene, halomethylnaphthalene, halomethylanthracene and mixtures thereof. Examples of $C_2$-$C_6$-alkyl ester of alpha-halo-$C_2$-$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein, the term "monomeric initiator" is meant to be distinguishable from polymeric initiators, such as polyethers, polyurethanes, polyesters and acrylic polymers having radically transferable groups.

In the ATRP preparation, the polymeric dispersant and the amounts and relative proportions of monomeric initiator, transition metal compound and ligand may be those for which ATRP is most effectively performed. The amount of initiator used can vary widely and is typically present in the reaction medium in a concentration of from 10-4 moles/liter (M) to 3 M, for example, from 10-3 M to 10-1 M. As the molecular weight of the polymeric dispersant can be directly related to the relative concentrations of initiator and monomer(s), the molar ratio of initiator to monomer is an important factor in polymer preparation. The molar ratio of initiator to monomer is typically within the range of 10-4:1 to 0.5:1, for example, 10-3:1 to 5×10-2:1.

In preparing the polymeric dispersant by ATRP methods, the molar ratio of transition metal compound to initiator is typically in the range of $10^4$:1 to 10:1, for example, 0.1:1 to 5:1. The molar ratio of ligand to transition metal compound is typically within the range of 0.1:1 to 100:1, for example, 0.2:1 to 10:1.

The polymeric dispersant may be prepared in the absence of solvent, i.e., by means of a bulk polymerization process. Often, the polymeric dispersant is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$-$C_4$ alkanes and fluorocarbons, may also be employed. One class of solvents is the aromatic hydrocarbon solvents, such as xylene, toluene, and mixed aromatic solvents such as those commercially available from Exxon Chemical America under the trademark SOLVESSO. Additional solvents are described in further detail in U.S. Pat. No. 5,807,937, at column 21, line 44 through column 22, line 54.

The ATRP preparation of the polymeric dispersant is typically conducted at a reaction temperature within the range of 25° C. to 140° C., for example, from 50° C. to 100° C., and a pressure within the range of 1 to 100 atmospheres, usually at ambient pressure.

The ATRP transition metal catalyst and its associated ligand are typically separated or removed from the polymeric dispersant prior to its use in the polymeric dispersants of the present invention. Removal of the ATRP catalyst may be achieved using known methods, including, for example, adding a catalyst binding agent to the mixture of the polymeric dispersant, solvent and catalyst, followed by filtering. Examples of suitable catalyst binding agents include, for example, alumina, silica, clay or a combination thereof. A mixture of the polymeric dispersant, solvent and ATRP catalyst may be passed through a bed of catalyst binding agent. Alternatively, the ATRP catalyst may be oxidized in situ, the oxidized residue of the catalyst being retained in the polymeric dispersant.

With reference to general formula (I), G may be a residue of at least one radically polymerizable ethylenically unsaturated monomer, such as a monomer selected from an oxirane functional monomer reacted with a carboxylic acid which may be an aromatic carboxylic acid or polycyclic aromatic carboxylic acid.

The oxirane functional monomer or its residue that is reacted with a carboxylic acid may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, napthoic acid, hydroxy napthoic acids, para-nitrobenzoic acid and mixtures thereof.

With continued reference to general formula (I), in certain embodiments, W and Y may each independently be residues of, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate, isocane (meth)acrylate, hydroxyethyl (meth)acrylate, hydroxypropyl (meth)acrylate, hydroxybutyl (meth)acrylate, butyl (meth)acrylate, methoxy poly(ethylene glycol) mono(meth)acrylate, poly(ethylene glycol) mono(meth)acrylate, methoxy poly(propylene glycol) mono (meth)acrylate, poly(propylene glycol) mono (meth)acrylate, methoxy copoly(ethylene glycol/propylene glycol) mono (meth)acrylate, and copoly(ethylene glycol/propylene glycol) mono (meth)acrylate.

In general formula (I), in certain embodiments, W and Y may each independently be residues of monomers having more than one (meth)acryloyl group, such as (meth)acrylic anhydride, diethyleneglycol bis(meth)acrylate,1,4-butanediol diacrylate, 1,6-hexanediol diacrylate, 4,4'-isopropylidenediphenol bis(meth)acrylate (Bisphenol A di(meth)acrylate), alkoxylated 4,4'-isopropylidenediphenol bis (meth)acrylate, trimethylolpropane tris(meth)acrylate, alkoxylated trimethylolpropane tris(meth)acrylate, polyethylene glycol di(meth)acrylate, polypropylene glycol di(meth)acrylate, and copoly(ethylene glycol/propylene glycol) di(meth)acrylate.

The letters p, q and s represent the average total number of G, W and Y residues, respectively, occurring per block or segment of G residues (G-block or G-segment), W residues (W-block or W-segment) and Y residues (Y-block or Y-segment), respectively. When containing more than one type or species of monomer residue, the W- and Y-blocks may each have at least one of random block (e.g., di-block and tri-block), alternating, and gradient architectures. Gradient architecture refers to a sequence of different monomer residues that change gradually in a systematic and predictable manner along the polymer backbone. For purposes of illustration, a W-block containing 6 residues of butyl methacrylate (BMA) and 6 residues of hydroxy propyl methacrylate (HPMA), for which q is 12, may have di-block, tetra-block, alternating and gradient architectures as described in U.S. Pat. No. 6,642,301, col. 10, lines 5-25. In certain embodiments, the G-block may include about 5-15 residues of glycidyl(meth)acrylate) reacted with an aromatic carboxylic acid (such as 3-hydroxy-2-napthoic acid), the W-block may be a random block of about 20-30 BMA and HPMA residues and the Y-block may be a uniform block of about 5-15 butyl acrylate (BA) residues.

The order in which monomer residues occur along the polymer backbone of the polymeric dispersant is typically determined by the order in which the corresponding monomers are fed into the vessel in which the controlled radical polymerization is conducted. For example, the monomers that are incorporated as residues in the G-block of the polymeric dispersant are generally fed into the reaction vessel prior to those monomers that are incorporated as residues in the W-block, followed by the residues of the Y-block.

During formation of the W- and Y-blocks, if more than one monomer is fed into the reaction vessel at a time, the relative reactivities of the monomers typically determine the order in which they are incorporated into the living polymer chain. Gradient sequences of monomer residues within the W- and Y-blocks can be prepared by controlled radical polymerization, and, in particular, by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937, at column 29, line 29 through column 31, line 35.

In certain embodiments, subscripts q and s each have a value of at least 1, such as at least 5 for general formula (I). Also, subscript s often has a value of less than 300, such as less than 100, or less than 50 (for example 20 or less) for general formula (I). The values of subscripts q and s may range between any combination of these values, inclusive of the recited values, for example, s may be a number from 1 to 100. Subscript p may have a value of at least 1, such as at least 5. Subscript p also often has a value of less than 300, such as less than 100 or less than 50 (e.g., 20 or less). The value of subscript p may range between any combination of these values, inclusive of the recited values, for example, p may be a number up to 50. The polymeric dispersant often has a number average molecular weight (Mn) of from 250 to 40,000, for example, from 1,000 to 30,000 or from 2,000 to 20,000, as determined by gel permeation chromatography using polystyrene standards.

Symbol Φ of general formula (I) is, or is derived from, the residue of the initiator used in the preparation of the polymeric dispersant by controlled radical polymerization, and is free of the radically transferable group of the initiator. For example, when the polymeric dispersant is initiated in the presence of toluene sulfonyl chloride, the symbol Φ, more specifically Φ–, is the residue,

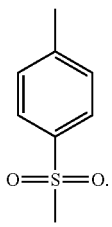

The symbol Φ may also represent a derivative of the residue of the initiator.

In general formula (I), T is or is derived from the radically transferable group of the ATRP initiator. The residue of the radically transferable group may be (a) left on the polymeric dispersant, (b) removed or (c) chemically converted to another moiety. The radically transferable group may be removed by substitution with a nucleophilic compound, for example, an alkali metal alkoxylate. When the residue of the radically transferable group is, for example, a cyano group (—CN), it can be converted to an amide group or carboxylic acid group by methods known in the art.

The polymeric dispersant is typically present in the graphenic carbon particle dispersion described above in an amount of at least 0.1 percent by weight, such as at least 0.5 percent by weight, or, in some cases, at least 1 percent by weight, based on the total weight of the graphenic carbon particle dispersion. The polymeric dispersant may typically be present in the graphenic carbon particle dispersion in an amount of less than 75 percent by weight, or less than 50 percent by weight, based on the total weight of the graphenic carbon particle dispersion. In certain embodiments, the polymeric dispersant may be present in the graphenic carbon particle dispersion in an amount of less than 30 percent by weight, or less than 15 percent by weight, based on the total weight of the graphenic carbon particle dispersion.

The graphenic carbon particle dispersion often also comprises at least water and/or at least one organic solvent. Classes of organic solvents that may be present include, but are not limited to, xylene, toluene, alcohols, for example, methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, for example, acetone, methyl ethyl ketone, and diacetone alcohol; ethers, for example, dimethyl ether and methyl ethyl ether; cyclic ethers, for example, tetrahydrofuran and dioxane; esters, for example, ethyl acetate, ethyl lactate, ethylene carbonate and propylene carbonate; polyhydric alcohols, for example, ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, for example, butyl 2-hydroxyethyl ether, hexyl 2-hydroxyethyl ether, methyl 2-hydroxypropyl ether and phenyl 2-hydroxypropyl ether; nitrogen containing cyclic compounds, for example, pyrrolidone, N-methyl-2-pyrrolidone and 1,3-dimethyl-2-imidazolidinone; and sulfur containing compounds such as thioglycol, dimethyl sulfoxide and tetramethylene sulfone. When the solvent comprises water, it can be used alone or in combination with organic solvents such as propylene glycol monomethylether, ethanol and the like.

The graphenic carbon particle dispersion may be prepared by the use of conventional mixing techniques such as energy intensive mixing or grinding means, such as ball mills or media mills (e.g., sand mills), attritor mills, 3-roll mills, rotor/stator mixers, high speed mixers, sonicators, and the like.

The graphenic carbon particles may be mixed with film-forming resins and other components of the compositions. For example, for two-part coating systems, the graphenic carbon particles may be dispersed into part A and/or part B. In certain embodiments, the graphenic carbon particles are dispersed into part A by various mixing techniques such as sonication, high speed mixing, media milling and the like. In certain embodiments, the graphenic carbon particles may be mixed into the coating compositions using high-energy and/or high-shear techniques such as sonication, 3-roll milling, ball milling, attritor milling, rotor/stator mixers, and the like.

The following examples are intended to illustrate various aspects of the present invention, and are not intended to limit the scope of the invention.

Example 1

A dispersion of thermally produced graphenic carbon particles was made by adding 54.15 g of solvent-born block copolymer dispersant (which comprises 43 weight % n-butyl acetate and 57 weight % block copolymer as disclosed in U.S. 2008/0188610), 76.45 g of n-butyl acetate, and 11.20 g of thermally produced graphenic carbon particles produced in accordance with the method disclosed in U.S. Pat. No. 8,486,364 having a measured BET surface area of 280 $m^2/g$. The ingredients were added to a 16 oz. glass jar. 700 g of 1.0-1.2 mm Zirconox milling media (from Jyoti Ceramic) was added into the jar. The jar was shaken for 4 hours using a Lau disperser (Model DAS 200, Lau, GmbH). The milling media were then separated from the dispersion product using paper cone paint filters. Extra n-butyl acetate was added to aid in achieving a higher yield from the filtration process. At this point the dispersion had a total solids content of 23.89 weight %, a resin solids content of 17.70 weight %, and a graphenic carbon particles content of 6.19 weight %. This dispersion was then placed into a 1.25 quart stainless steel beaker, which was wrapped with a ¼ inch coil of copper tubing through which water was flowing at a low rate to achieve cooling of the beaker. 600 g of glass beads (Duraspheres, GL0179B, from MO-Sci Corporation) of diameter 40 to 80 microns were added to the beaker. A Premier mill dispersator 2000 running at 6000 RPM with a black Norblade polyethylene 1.75 inch impeller were used to further disperse the graphenic carbon particles. Extra n-butyl acetate was added at intervals to maintain proper viscosity of mill base in the beaker and maintain a "rolling doughnut" shape of the mill base around the spinning milling blade. The dispersion was milled in the beaker for 15 hours. The final product was obtained by filtering off the glass beads through a nylon mesh filter bag (33-NMO 1 X1R-RB, from Brown and O'Malley Co.) The final dispersion had total solids of 14.18 weight %, resin solids of 10.51 weight %, and graphenic carbon particles content of 3.67 weight %.

Example 2

A dispersion of thermally produced graphenic carbon particles was produced by adding 33.85 g of solvent-born block copolymer dispersant (which comprises 43 weight % n-butyl acetate and 57 weight % block copolymer as disclosed in U.S. 2008/0188610), 29.15 g of n-butyl acetate, and 7.00 g of thermally produced graphenic carbon particles produced in accordance with the method disclosed in U.S. Pat. No. 8,486,364 having a measured BET surface area of 280 $m^2/g$ into an 8 oz. glass jar along with 350 g of 1.0-1.2 mm Zirconox milling media (from Jyoti Ceramic). The jar was shaken for 4 hours using a Lau disperser (Model DAS 200, Lau, GmbH). The milling media were then separated from the dispersion product using paper cone paint filters. The final dispersion had 37.50 weight % total solids, 27.76 weight % resin solids, and 9.72 weight % graphenic carbon particles.

Example 3

A carbon black pigment dispersion was produced by making a pre-dispersion in a Premier PSM-11 basket mill, using 0.8-1.0 Zirconox milling media (from Jyoti Ceramic). The ingredients were 7.55 lbs. of solvent-born block copolymer dispersant (which comprises 43 weight % n-butyl acetate and 57 weight % block copolymer as disclosed in U.S.2008/0188610), 12.12 lbs. of n-butyl acetate, and 3.02 lbs. of carbon black pigment (Emperor 2000 from Cabot Corporation). It was milled for 60 minutes to a Hegman of 6.5 to 7. Another 5.0 lbs. of n-butyl acetate were added as basket mill wash. The pre-dispersion was transferred to a QM-1 mill (from Premier Mill) and was run at a mill speed of 3000 RPM with a product temperature of 121° F. with 0.3 mm YTZ milling media (from Tosoh Corporation) for 40 minutes of residence time. The final dispersion was 33.24 weight % total solids, 24.70 weight % resin solids, and 8.54 weight % carbon black pigment.

Example 4

A carbon black pigment dispersion was produced by adding 33.85 g of solvent-born block copolymer (which comprises 43 weight % n-butyl acetate and 57 weight % block copolymer as disclosed in U.S. 2008/0188610), 29.15 g of n-butyl acetate, and 7.00 g of carbon black pigment (Monarch 1300, from Cabot Corporation) into an 8 oz. glass jar along with 350 g of 1.0-1.2 mm Zirconox milling media (from Jyoti Ceramic). The jar was shaken for 4 hours using a Lau disperser (Model DAS 200, Lau, GmbH). The milling media were then separated from the dispersion product using paper cone paint filters. The final dispersion had 36.30 weight % total solids, 28.72 weight % resin solids, and 7.61 weight % carbon black pigment.

Example 5

Figure 5:
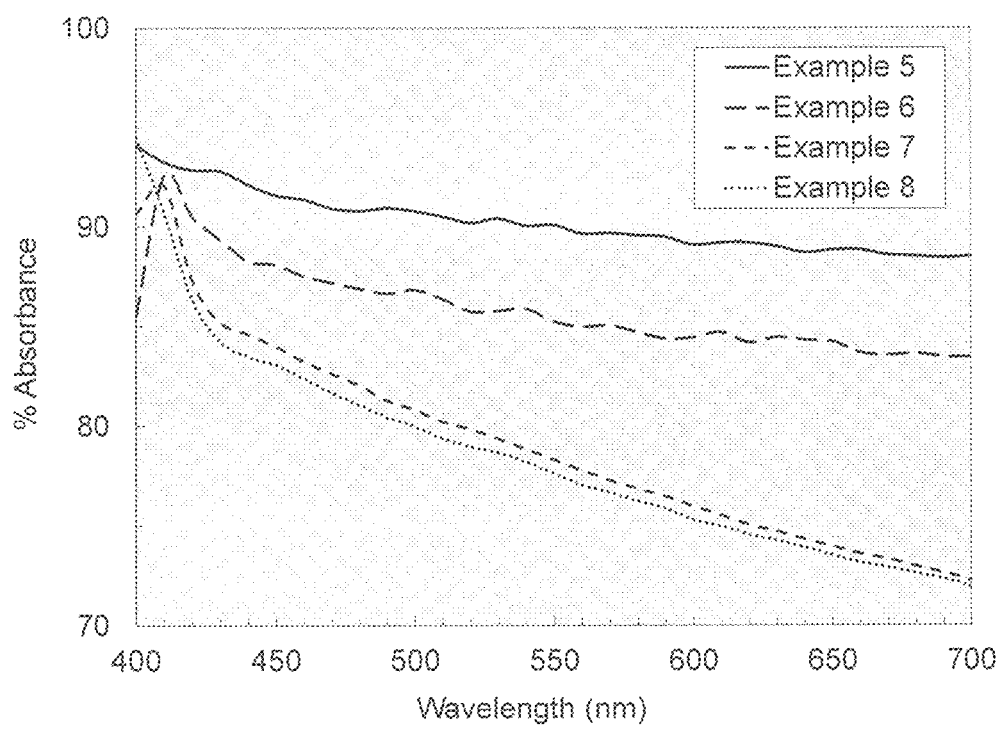
FIG. 5 is a graph of absorbance versus wavelengths within the visible region of the electromagnetic spectrum, showing increased absorbance for coatings of the present invention comprising thermally produced graphenic particles in comparison with coatings comprising carbon black pigment particles.
Figure 6:
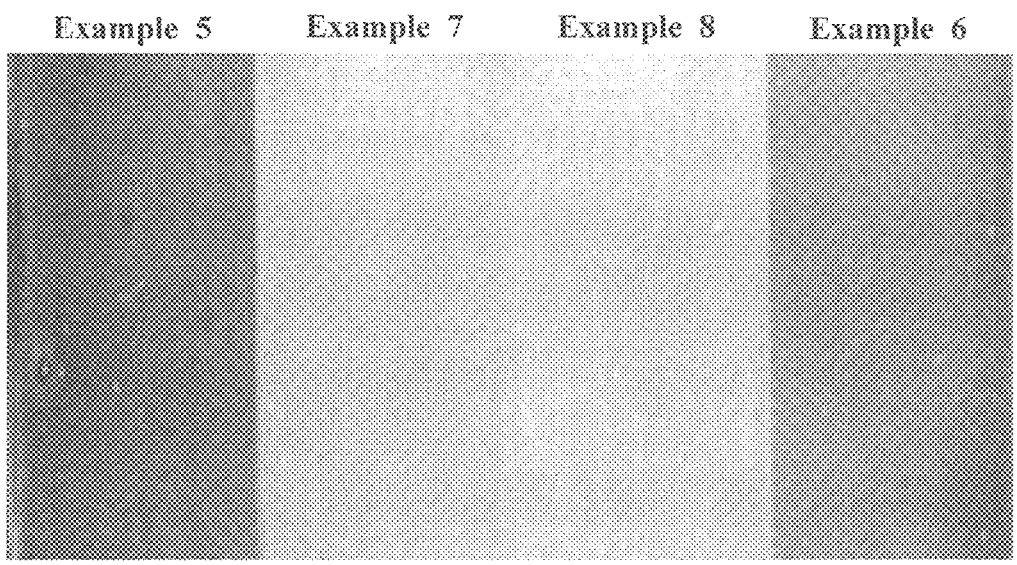
FIG. 6 is a photograph of dark coatings of the present invention comprising thermally produced graphic carbon particles in comparison with lighter coatings comprising carbon black pigments.

To evaluate the opacity and absorption of graphenic carbon particles, a tinted coating was made comprising 20.00 g of solvent-born block copolymer (which comprises 40.83 weight % n-butyl acetate and 59.17 weight % block copolymer as disclosed in U.S. 2008/0188610), 1.64 g of the dispersion from Example 1, and 5.17 g of n-butyl acetate. This was thoroughly mixed and then drawn down using a #44 wire wound draw down bar (from R. D. Specialties) onto a black/white opacity chart (Chart PA-2812, from BYK-Gardner). The film was baked in an oven for 30 minutes at 212° F. The final dried film had a thickness of 20 microns and contained 0.5 weight % of the graphenic carbon particles. The absorption spectrum of the draw down film is shown in FIG. 5. FIG. 6 includes a photograph of the film (labeled as Example 5), illustrating the dark appearance of the film.

Example 6

To evaluate the opacity and absorption of graphenic carbon particles, a tinted coating was made comprising 20.00 g of solvent-born block copolymer (which comprises 40.83 weight % n-butyl acetate and 59.17 weight % block copolymer as disclosed in U.S.2008/0188610), 0.60 g of the dispersion from Example 2, and 6.21 g of n-butyl acetate. This was thoroughly mixed and then drawn down using a #44 wire wound draw down bar (from R. D. Specialties) onto a black/white opacity chart (Chart PA-2812, from BYK-Gardner). The film was baked in an oven for 30 minutes at 212° F. The final dried film had a thickness of 20 microns and contained 0.5 weight % of the graphenic carbon particles. The absorption spectrum of the draw down film is shown in FIG. 5. FIG. 6 includes a photograph of the film (labeled as Example 6), illustrating the dark appearance of the film.

Example 7

A comparative example to Examples 5 and 6 was made by making a tinted coating containing carbon black pigment. The tinted coating was made by mixing together 20.00 g of solvent-born block copolymer (which comprises 40.83 weight % n-butyl acetate and 59.17 weight % block copolymer as disclosed in U.S. 2008/0188610), 0.69 g of the dispersion from Example 3, and 6.13 g of n-butyl acetate. This was drawn down using a #44 wire wound draw down bar (from R. D. Specialties) onto a black/white opacity chart (Chart PA-2812, from BYK-Gardner). The film was baked in an oven for 30 minutes at 212° F. The final dried film had a thickness of 20 microns and contained 0.5 weight % of the carbon black pigment. The absorption spectrum of the draw down film is shown in FIG. 5. FIG. 6 includes a photograph of the film (labeled as Example 7), illustrating the relatively light appearance of the film. Visual comparison of the draw downs (FIG. 6) and comparison of the data (FIG. 5) show that the thermally produced graphenic carbon particles are hiding better and are more neutrally colored (gray rather than brown) than carbon black pigment.

Example 8

A comparative example to Example 5 and 6 was made by making a tinted coating containing a carbon black pigment. The tinted coating was made by mixing together 20.00 g of solvent-born block copolymer (which comprises 40.83 weight % n-butyl acetate and 59.17 weight % block copolymer as disclosed in U.S. 2008/0188610), 0.58 g of the dispersion from Example 4, and 6.23 g of n-butyl acetate. This was drawn down using a #44 wire wound draw down bar (from R. D. Specialties) onto a black/white opacity chart (Chart PA-2812, from BYK-Gardner). The film was baked in an oven of 30 minutes at 212° F. The final dried film had a thickness of 20 microns and contained 0.5 weight % of the carbon black pigment. The absorption spectrum of the draw down film is shown in FIG. 5. FIG. 6 includes a photograph of the film (labeled as Example 8), illustrating the relatively light appearance of the film. Visual comparison of the draw downs (FIG. 6) and comparison of the data (FIG. 5) show that the thermally produced graphenic carbon particles are hiding better and are more neutrally colored (gray rather than brown) than carbon black pigment.

FIG. 5 is a graph of absorbance versus wavelength for the films described in Examples 5 through 8. Specifically, the absorbance spectra labeled Example 5 and Example 6 in FIG. 5 were obtained using the draw down samples from Examples 5 and 6 with 20 micron-thick coatings containing 0.5 weight percent graphenic carbon particles, as described in those examples. The absorbance spectra labeled Example 7 and Example 8 in FIG. 5 were obtained using the draw down samples from Examples 7 and 8 with coatings containing carbon black, as described in those examples.

The absorbance values were obtained by measuring the reflectance at wavelengths from 400 to 700 nm at 10 nm intervals using an X-Rite Color i7 spectrophotometer, of the pigmented films over the black and white portions of the substrate. In addition, the reflectance values of the black and white portions of the substrate itself were similarly measured. Using all of these reflectance values of the films and of the black and white portions of the substrate, the reflectance and transmittance of the pigmented films themselves (in the absence of a substrate) were derived using the equation $R_m = R_1 + (T_1^2 R_2)/(1 - R_1 R_2)$, which is Equation 16 from Wen-Dar Ho, Chen-Chi M. Ma, and Lieh-Chun Wu, "Diffuse Reflectance and Transmittance of IR Absorbing Polymer Film", *Polymer Engineering and Science*, October 1998, Volume 38, No. 10. This equation, applied to the film measured over the white portion of the substrate is $R_{mw} = R + (T^2 R_w)/(1 - RR_w)$, where $R_{mw}$ is the measured reflectance of the film over the white portion of the substrate, R is the actual reflectance of the pigmented film in the absence of the substrate, T is the actual transmittance of the pigmented film in the absence of the substrate, and $R_w$ is the measured reflectance of the white portion of the substrate. This equation, applied to the film measured over the black portion of the substrate is $R_{mb} = R + (T^2 R_b)/(1 - RR_b)$, where $R_{mb}$ is the measured reflectance of the film over the black portion of the substrate, R is the actual reflectance of the pigmented film in the absence of the substrate, T is the actual transmittance of the pigmented film in the absence of the substrate, and $R_b$ is the measured reflectance of the black portion of the substrate. With the measured reflectances, we can solve this equation for the two unknowns: R and T. Namely, $R = (R_w R_{mb} - R_b R_{mw})/[R_w - R_b - R_w R_b (R_{mw} - R_{mb})]$ and $T = SQRT\{(R_{mw} - R)/[R_w(1 - RR_w)]\}$, where SQRT is the square root function. Then, using Kirchoff's law (R+T+A=1, or written as percentages % R+% T+% A=100), where R is the reflectance, T is the transmittance, and A is the absorbance, or where % R is the percent reflectance, % T is the percent transmittance, and % A is the percent absorbance, the absorbance was calculated from the derived R and T values at each wavelength. In addition to demonstrating higher absorbances for the Example 5 and Example 6 samples throughout the visible range of 400 to 700 nm, the results shown in FIG. 5 also demonstrate that the Example 5 and Example 6 samples have less variance in their absorbances within the visible range, e.g., the highest and lowest absorbance values for specific wavelengths within the 400 to 700 nm range are well below 10 percent for the Example 5 and Example 6 samples as demonstrated by their relatively flat and horizontal plots. While the results shown in FIG. 5 correspond to wavelengths in the visible region (400 to 700 nm), it is to be understood that the use of the present graphenic carbon particles in coatings and other materials may also result in improved properties in other regions, including the UV region and/or IR region.

Example 9

Figure 7:
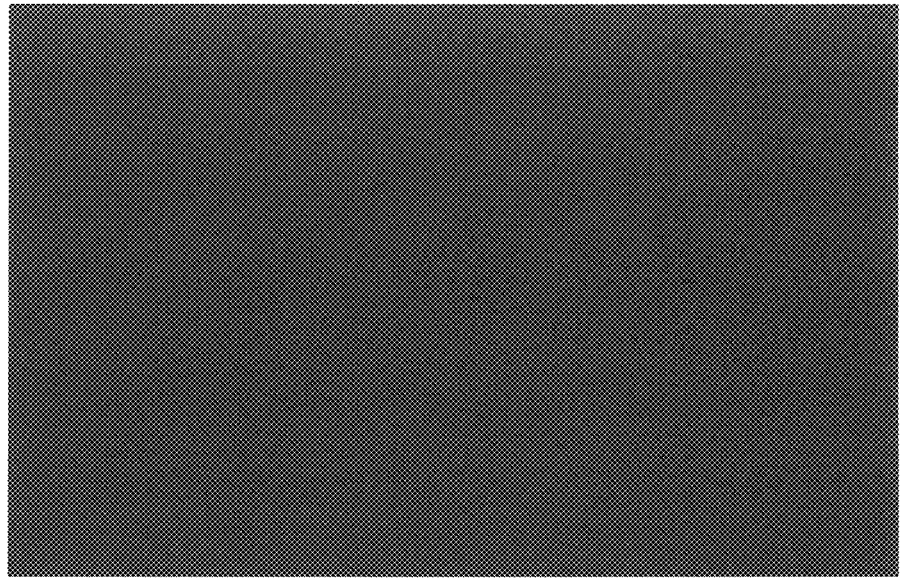
FIGS. 7 and 8 are back-lit photographs of a coating of the present invention containing an absorptive pigment comprising thermally produced graphenic particles in comparison with a coating containing carbon black pigment particles.

FIG. 7 illustrates a backlit coating sample comprising thermally produced graphenic carbon particles as an absorptive pigment, film forming resins primarily consisting of polyester and melamine, and inorganic pigments primarily consisting of $TiO_2$ and barytes. The coating sample was spray applied on to glass at a final dry film thickness of 1.1-1.2 mils. The sample was backlit via LED lighting directly on to the uncoated glass side and photographed in a dark room.

Figure 8:
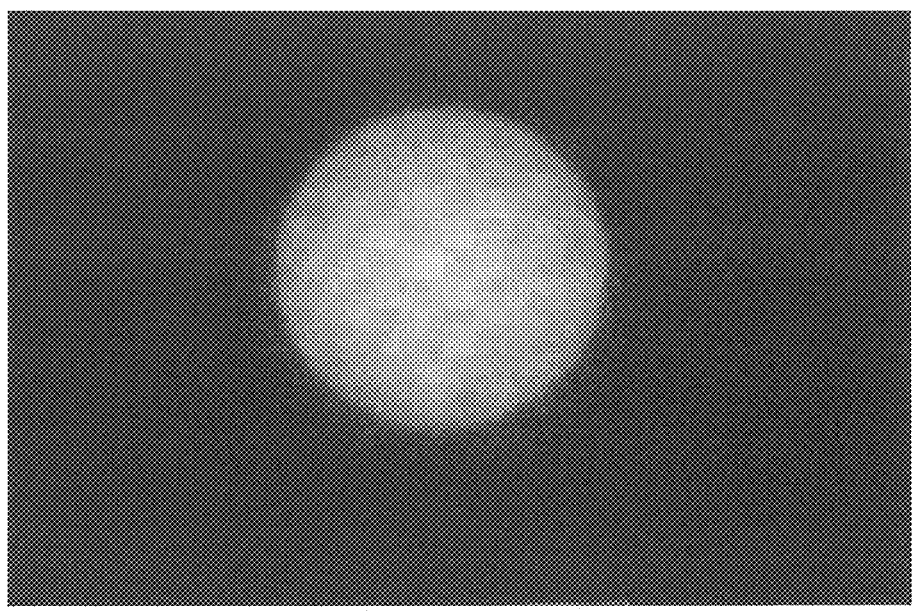

FIG. 8 illustrates a backlit coating sample comprising a carbon black pigment prepared identically to the coating sample shown in FIG. 7, with the exception that the thermally produced graphenic carbon particles were replaced with carbon black pigment. Sample preparation, resin formulation, film application and final dry film thickness were identical to that of the coating sample illustrated in FIG. 7. The sample was backlit via LED lighting directly on to the uncoated glass side and photographed in a dark room.

As shown by comparing the backlit coating samples in FIGS. 7 and 8, the coating comprising the thermally produced graphenic carbon particle black pigment exhibits superior opacity and absorption in comparison with the coating comprising carbon black.

Example 10

Figure 9:
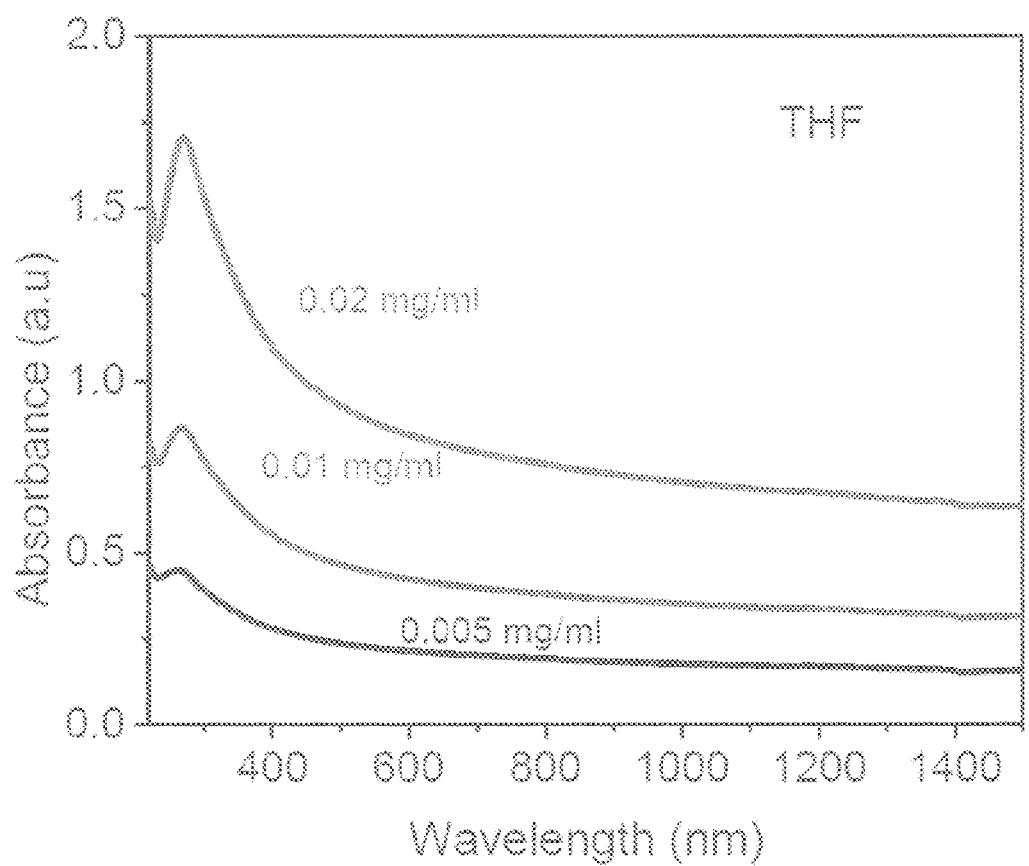
FIG. 9 is a graph of absorbance versus wavelength ranges in the ultraviolet, visible and near infrared regions of the electromagnetic spectrum, showing good absorbance in those regions for thermally produced graphenic carbon particles of the present invention dispersed in a solvent.

Thermally produced graphenic carbon particles produced as in Example 1 were dispersed in tetrahydrofuran (THF) at various concentrations of 0.005 mg/ml, 0.01 mg/ml and 0.02 mg/ml using bath sonication for 1-3 hours (VWR Aquasonic HT250 bath sonicator). Spectrographic absorbance characteristics at UV, visible and near IR wavelengths were measured. The results are shown in FIG. 9. High absorbance is demonstrated in the short wavelength UV region, visible region, and near IR region of the spectrum.

Example 11

For comparison purposes, non-thermally produced graphene made from exfoliated graphite (GNP) was dispersed in a similar manner as the thermally produced graphenic carbon particles described in Example 10. The comparative GNP graphene particles were prepared by acid intercalation, thermal shock exfoliation and bath sonication. Such exfoliated GNPs were further exfoliated in a liquid phase by strong probe sonication and subsequent centrifugation (GNP-EX). Such exfoliated GNPs were also used as the starting material in a Hummers oxidation process to produce graphite oxide (GO), which was converted into reduced graphite oxide (RGO) using hydrazine, or into octadecylamine functionalized graphite (ODA-G). Such types of exfoliated grapheme particles were dispersed in THF at concentrations of 0.01 mg/ml using bath sonication for comparison with the 0.01 mg/ml concentration of thermally produced graphic carbon particles of Example 10. Absorbance results are plotted in FIG. 10, which demonstrates significantly increased absorbance throughout the 400-1,400 nm wavelength region for the thermally produced graphenic carbon particle dispersion (labeled as PPGG in FIG. 10) in comparison with the comparative dispersions containing exfoliated graphene (labeled as GNP, GNP-EX, RGO and ODA-G in FIG. 10).

Figure 10:
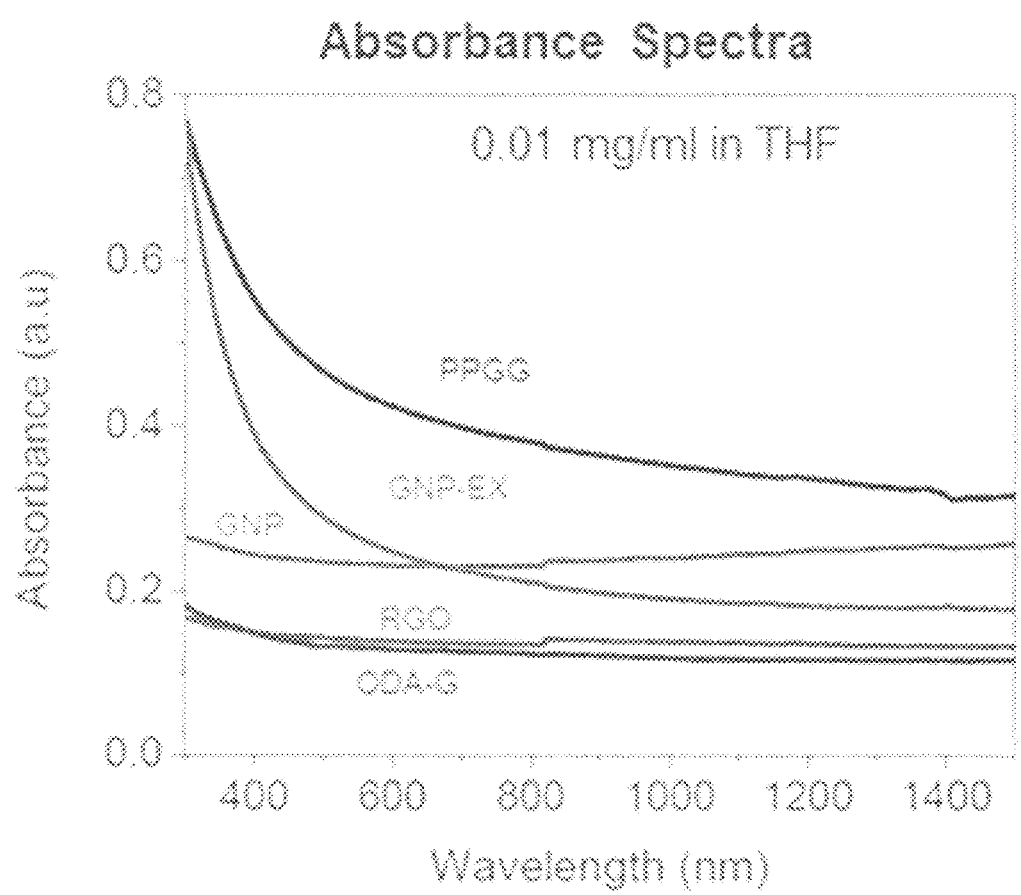
FIG. 10 is a graph of absorbance versus wavelength ranges in the ultraviolet, visible and near infrared regions of the electromagnetic spectrum, showing increased absorbance in those regions for a thermally produced graphenic carbon particle dispersion of the present invention in comparison with dispersions of non-thermally produced graphenic carbon particles made from exfoliated graphite.

The absorption spectra plots shown in FIGS. 9 and 10 were prepared as a function of concentration using a Varian Cary 5000 spectrophotometer using cuvettes of 10 mm light path.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Accordingly, the particular embodiments described in detail herein are illustrative only and are not limiting to the scope of the invention.

We claim:

1. An absorptive coating comprising:
a resin film; and
an absorptive pigment comprising thermally produced graphenic carbon particles in an amount up to 20 weight percent based on the total dry film weight of the coating, wherein the absorptive coating has a minimum absorbance of 80 percent throughout a wavelength range of 400 to 1,400 nm.

2. The absorptive coating of claim 1, wherein the thermally produced graphenic carbon particles comprise from 0.01 to 5 weight percent.

3. The absorptive coating of claim 1, wherein the minimum absorbance is greater than 85 percent.

4. The absorptive coating of claim 1, wherein the thermally produced graphenic carbon particles are produced from a hydrocarbon precursor material capable of forming a two-carbon-fragment species or a hydrocarbon material comprising methane introduced into a thermal zone at a temperature of greater than 3,500° C.

5. The absorptive coating of claim 1, wherein the thermally produced graphenic carbon particles have an average aspect ratio greater than 3:1, a B.E.T. specific surface area of greater than 70 m$^2$/g, and a Raman spectroscopy 2D/G peak ratio of at least 0.9:1.

6. The absorptive coating of claim 1, wherein the resin film comprises a thermoset or thermoplastic film forming resin.

7. The absorptive coating of claim 1, wherein the absorptive coating is applied on a substrate.

8. The absorptive coating of claim 7, further comprising at least one intermediate coating between the absorptive coating and the substrate.

9. The absorptive coating of claim 8, wherein the at least one intermediate coating comprises a primer coating or a color coating.

10. The absorptive coating of claim 7, further comprising a top coating applied on at least a portion of the absorptive coating.

11. The absorptive coating of claim 10, wherein the top coating comprises a color coating or a clear coating.

12. An absorptive coating composition comprising:
a solvent;

a film-forming resin; and thermally produced graphenic carbon particles in an amount up to 20 weight percent of the total solids weight of the film-forming resin and the thermally produced graphenic carbon particles, wherein the absorptive coating composition has a minimum absorbance of 80 percent throughout a wavelength range of 400 to 1,400 nm when cured.

13. The absorptive coating composition of claim 12, wherein the thermally produced graphenic carbon particles comprise from 0.01 to 5 weight percent.

14. The absorptive coating composition of claim 12, wherein the thermally produced graphenic carbon particles have an average aspect ratio greater than 3:1, a B.E.T. specific surface area of greater than 70 $m^2/g$, and a Raman spectroscopy 2D/G peak ratio of at least 0.9:1.

15. The absorptive coating composition of claim 12, wherein the film-forming resin comprises a thermoset or thermoplastic film forming resin.

16. An article comprising:

a matrix material; and an absorptive pigment dispersed in the matrix material comprising thermally produced graphenic carbon particles in an amount up to 20 weight percent based on the total weight of the matrix material and the thermally produced graphenic carbon particles, wherein the article has a minimum absorbance of 80 percent throughout a wavelength range of 400 to 1,400 nm.

17. The article of claim 16, wherein the thermally produced graphenic carbon particles comprise from 0.01 to 10 weight percent.

18. The article of claim 16, wherein the matrix material comprises a polymer.

19. A method of making an absorptive coating composition comprising dispersing thermally produced graphenic carbon particles and a film-forming resin in a solvent, wherein the thermally produced graphenic carbon particles comprise up to 20 weight percent of the total solids weight of the film-forming resin and the thermally produced graphenic carbon particles, and the absorptive coating composition has a minimum absorbance of 80 percent throughout a wavelength range of 400 to 1,400 nm when cured.

20. The method of claim 19, wherein the thermally produced graphenic carbon particles are produced by introducing a methane precursor material or a hydrocarbon precursor material capable of forming a two-carbon-fragment species into a thermal zone having a temperature of greater than 3,500° C.

\* \* \* \* \*